(12) United States Patent
Ha et al.

(10) Patent No.: US 11,848,131 B2
(45) Date of Patent: Dec. 19, 2023

(54) ELECTRICAL STEEL SHEET LAMINATE

(71) Applicant: POSCO, Pohang-si (KR)

(72) Inventors: Bongwoo Ha, Pohang-si (KR); Jung-Woo Kim, Pohang-si (KR); Taeyoung No, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 334 days.

(21) Appl. No.: 17/280,416

(22) PCT Filed: Sep. 25, 2019

(86) PCT No.: PCT/KR2019/012470
§ 371 (c)(1),
(2) Date: Jul. 27, 2021

(87) PCT Pub. No.: WO2020/067720
PCT Pub. Date: Apr. 2, 2020

(65) Prior Publication Data
US 2022/0005635 A1    Jan. 6, 2022

(30) Foreign Application Priority Data
Sep. 27, 2018  (KR) .................. 10-2018-0115284

(51) Int. Cl.
*H01F 1/147* (2006.01)
*B32B 7/12* (2006.01)
*B32B 15/18* (2006.01)

(52) U.S. Cl.
CPC .............. *H01F 1/147* (2013.01); *B32B 7/12* (2013.01); *B32B 15/18* (2013.01); *B32B 2307/208* (2013.01)

(58) Field of Classification Search
None
See application file for complete search history.

(56) References Cited

U.S. PATENT DOCUMENTS

| | | | | |
|---|---|---|---|---|
| 4,517,325 A | * | 5/1985 | Perfetti | .................. H01B 3/441 524/188 |
| 2011/0039120 A1 | | 2/2011 | Fujii et al. | |

(Continued)

FOREIGN PATENT DOCUMENTS

| | | |
|---|---|---|
| CN | 1116357 A | 2/1996 |
| CN | 101720344 A | 6/2010 |

(Continued)

OTHER PUBLICATIONS

International Search Report issued in corresponding International Patent Application No. PCT/KR2019/012470 dated Jan. 13, 2020.

(Continued)

*Primary Examiner* — Seth Dumbris
(74) *Attorney, Agent, or Firm* — Morgan, Lewis & Bockius LLP

(57) ABSTRACT

An embodiment of the present invention provides an electrical steel sheet laminate, including: a plurality of electrical steel sheets; and a fusion layer disposed between the electrical steel sheets, wherein the fusion layer includes an olefin-based semi-crystalline polymer and at least one inorganic metal compound of a metal phosphate and a metal chromate.

10 Claims, 2 Drawing Sheets

(56) References Cited

U.S. PATENT DOCUMENTS

| | | | |
|---|---|---|---|
| 2012/0171467 A1* | 7/2012 | Takeda | C09D 5/084 428/327 |
| 2014/0134398 A1 | 5/2014 | Sambasivan et al. | |
| 2018/0033529 A1 | 2/2018 | Takeda et al. | |
| 2019/0010567 A1* | 1/2019 | Kim | C08K 3/32 |
| 2022/0001646 A1* | 1/2022 | Kim | C09J 163/00 |

FOREIGN PATENT DOCUMENTS

| | | | |
|---|---|---|---|
| CN | 102227515 A | | 10/2011 |
| CN | 102877054 A | | 1/2013 |
| CN | 105264115 A | | 1/2016 |
| CN | 107250431 A | | 10/2017 |
| CN | 108473844 A | | 8/2018 |
| CN | 108475553 A | | 8/2018 |
| JP | 2007-076127 A | | 3/2007 |
| JP | 2007076127 A | * | 3/2007 |
| JP | 2011-168836 A | | 9/2011 |
| JP | 2012-186007 A | | 9/2012 |
| JP | 2019-508573 A | | 3/2019 |
| KR | 10-0698431 B1 | | 3/2007 |
| KR | 10-1052123 B1 | | 7/2011 |
| KR | 10-1128156 B1 | | 3/2012 |
| KR | 10-1168509 B1 | | 7/2012 |
| KR | 10-2015-0061472 A | | 6/2015 |
| KR | 10-1532015 B1 | | 6/2015 |
| KR | 10-2015-0074817 A | | 7/2015 |
| KR | 10-2017-0074110 A | | 6/2017 |
| KR | 10-2017-0075527 A | | 7/2017 |
| KR | 10-2018-0074438 A | | 7/2018 |
| KR | 10-2020-0036536 A | | 4/2020 |
| KR | 10-2020-0066509 A | | 6/2020 |
| WO | 2010-061722 A | | 6/2010 |
| WO | WO-2017111244 A1 * | | 6/2017 ............ B32B 15/04 |

OTHER PUBLICATIONS

Extended European Search Report dated Oct. 22, 2021 issued in European Patent Application No. 19868068.8.

Edited by: Yang Mingshan, et al., "Modern Engineering Plastics Modifications—Theory and Practive," China Light Industry Press, Jul. 31, 2009.

J. Wang, "Packaging Materials Science," China Light Industry Press, Jan. 2009, pp. 111-112 (with English translation).

Notice of Allowance issued in Chinese patent application 201980077127.4 dated May 24, 2021.

Japanese Office Action dated Jul. 4, 2023 issued on Japanese Patent Application No. 2021-517633.

* cited by examiner

ELECTRICAL STEEL SHEET LAMINATE

CROSS-REFERENCE TO RELATED APPLICATIONS

This application is the U.S. National Phase under 35 U.S.C. § 371 of International Patent Application No. PCT/KR2019/012470, filed on Sep. 25, 2019 which claims priority to and the benefit of Korean Application No. 10-2018-0115284 filed in the Korean Intellectual Property Office on Sep. 27, 2018, the entire contents of which are incorporated herein by reference.

TECHNICAL FIELD

An embodiment of the present invention relates to an electrical steel sheet laminate. More particularly, an embodiment of the present invention relates to an electrical steel sheet laminate in which a fusion layer capable of bonding (fastening) electrical steel sheets is formed without using conventional fastening methods such as welding, clamping, and interlocking. More particularly, an embodiment of the present invention relates to an electrical steel sheet laminate having improved adhesion between electrical steel sheets by controlling a component of a fusion layer formed between the electrical steel sheets.

BACKGROUND ART

A non-oriented electrical steel sheet is a steel sheet of which a magnetic property thereof is uniform in all directions on a rolling plate, and is widely used for a motor, an iron core of an electric generator, an electric motor, a small transformer, and the like.

The non-oriented electrical steel sheet may be divided into two types, such as one in which stress-removing annealing (SRA) for improving the magnetic property after punching work should be practiced, and the other in which the SRA is omitted if a cost loss is larger than the effect of the magnetic property by the SRA.

An insulation film is a film coated in a finishing manufacturing process of a laminate such as a motor, an iron core of a generator, an electric motor, a small transformer, etc., and it is usually required to have electrical characteristics that suppress generation of eddy currents. In addition, continuous punching workability, anti-stickiness, and a surface close contacting property are required. The continuous punching workability indicates an ability to suppress the wear of a mold when a plurality of films are stacked into an iron core after a punching process is performed to have a predetermined shape. The anti-stickiness indicates an ability of not allowing iron core steel sheets to closely stick to each other after a stress relief annealing process for relieving machining stress of a steel sheet to recover a magnetic characteristic.

In addition to such basic characteristics, excellent application workability of a coating solution, solution stability such that it is usable for a long period after mixing, and the like are also required. It is required to use an additional fastening method such as welding, clamping, or interlocking when the insulation film is manufactured as an electrical steel sheet laminate.

DISCLOSURE

An embodiment of the present invention has been made in an effort to provide an electrical steel sheet laminate in which a fusion layer capable of bonding (fastening) electrical steel sheets is formed without using conventional fastening methods such as welding, clamping, and interlocking, and a manufacturing method thereof. More particularly, an embodiment of the present invention has been made in an effort to provide an electrical steel sheet adhesive coating composition, an electrical steel sheet laminate, and a manufacturing method thereof, capable of improving adhesion between electrical steel sheets by controlling a component of a fusion layer formed between the electrical steel sheets.

An embodiment of the present invention provides an electrical steel sheet laminate, including: a plurality of electrical steel sheets; and a fusion layer disposed between the electrical steel sheets, wherein the fusion layer includes an olefin-based semi-crystalline polymer and at least one inorganic metal compound of a metal phosphate and a metal chromate.

The olefin-based semi-crystalline polymer may include one or more of a polyethylene semi-crystalline polymer and a polypropylene semi-crystalline polymer.

The olefin-based semi-crystalline polymer may have a weight average molecular weight of 1000 to 30,000.

The olefin-based semi-crystalline polymer may have a softening point of 50 to 120° C.

The metal phosphate and metal chromate may include one or more metals of Al, Mg, Ca, Co, Zn, Zr, and Fe.

The fusion layer may have a microphase of an inorganic metal compound, and with respect to a cross-section including a thickness direction of the fusion layer, a fraction of an area occupied by the microphase of the inorganic metal compound may be 10% or less.

An average diameter of the microphase of the inorganic metal compound may be 20% or less of a thickness of the fusion layer.

A thickness of the fusion layer may be 0.5 to 40 μm.

The electrical steel sheet laminate may further include a fusion interface layer disposed between the electrical steel sheets and the fusion layer.

The fusion interface layers may include at least one metal of Al, Mg, Ca, Co, Zn, Zr, and Fe (0.5 to 10 wt %), and at least one of P and Cr (5 to 30 wt %) and a balance of O.

A thickness of the fusion interface layer may be 10 to 500 nm.

According to the embodiments of the present invention, it is possible to improve adhesion between electrical steel sheets by controlling a component of a fusion layer formed between the electrical steel sheets.

According to the embodiments of the present invention, it is possible to improve adherence between electrical steel sheets by controlling a microphase of an inorganic metal compound in a fusion layer formed between the electrical steel sheets.

According to the embodiments of the present invention, an electrical steel sheet may be adhered without using a conventional fastening method such as welding, clamping or interlocking, thereby further increasing a magnetic property of a non-oriented electrical steel sheet laminate.

MODE FOR INVENTION

It will be understood that, although the terms first, second, third, etc. may be used herein to describe various elements, components, regions, layers, and/or sections, they are not limited thereto. These terms are only used to distinguish one element, component, region, layer, or section from another element, component, region, layer, or section. Thus, a first component, constituent element, or section described below may be referred to as a second component, constituent element, or section, without departing from the range of the present invention.

The terminologies used herein are used just to illustrate a specific embodiment, but are not intended to limit the present invention. It must be noted that, as used in the specification and the appended claims, singular forms used herein include plural forms unless the context clearly dictates the contrary. It will be further understood that the term "comprises" or "includes", used in this specification, specifies stated properties, regions, integers, steps, operations, elements, and/or components, but does not preclude the presence or addition of other properties, regions, integers, steps, operations, elements, components, and/or groups.

When referring to a part as being "on" or "above" another part, it may be positioned directly on or above the other part, or another part may be interposed therebetween. In contrast, when referring to a part being "directly above" another part, no other part is interposed therebetween.

Unless defined otherwise, all terms including technical and scientific terms used herein have the same meanings as those commonly understood by one of ordinary skill in the art to which the present invention belongs. Such terms as those defined in a generally used dictionary are to be interpreted to have the same meanings as contextual meanings in the relevant field of art, and are not to be interpreted to have idealized or excessively formal meanings unless clearly defined in the present application.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

An embodiment of the present invention provides an electrical steel sheet laminate.

Figure 1:
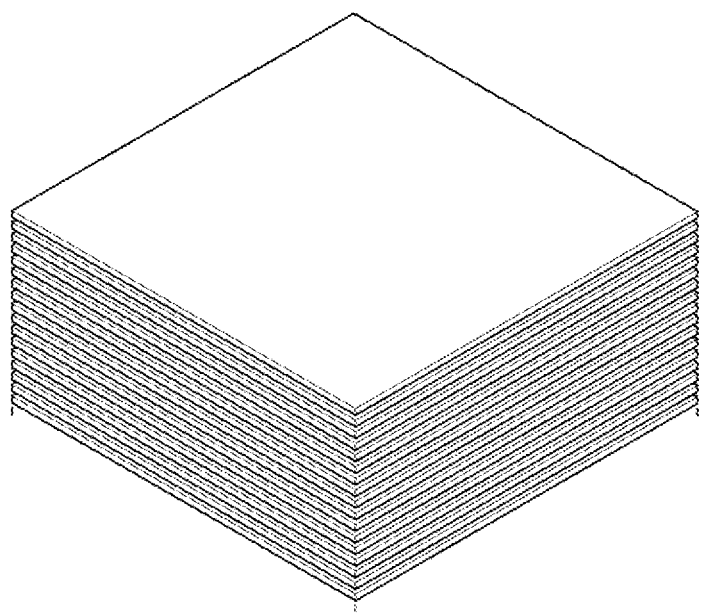
FIG. 1 illustrates a schematic view of an electrical steel sheet laminate.

An electrical steel sheet laminate according to an embodiment of the present invention includes a plurality of electrical steel sheets, and a fusion layer disposed between the electrical steel sheets. FIG. 1 illustrates a schematic view of an electrical steel sheet laminate according to an embodiment of the present invention. As illustrated in FIG. 1, a plurality of electrical steel sheets are laminated.

Figure 2:
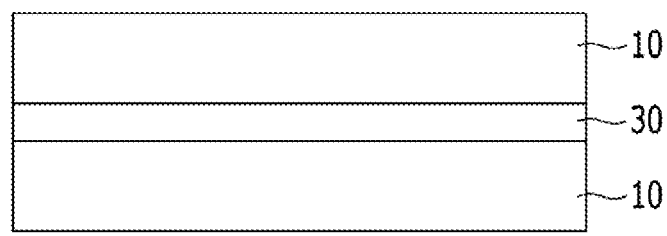
FIG. 2 illustrates a schematic diagram of a cross-section of an electrical steel sheet laminate according to an embodiment of the present invention.

FIG. 2 illustrates a schematic diagram of a cross-section of an electrical steel sheet laminate according to an embodiment of the present invention. As illustrated in FIG. 2, according to the present embodiment, the electrical steel sheet laminate 100 includes a plurality of electrical steel sheets 10, and a fusion layer 30 disposed between the electrical steel sheets.

The electrical steel sheet laminate according to an embodiment of the present invention may be a laminate in which different electrical steel sheets are thermally fused by forming a fusion layer simply using the above-described adhesive coating composition without using a conventional method such as welding, clamping, and interlocking.

In this case, the electrical steel sheet laminate has excellent properties of high temperature adhesiveness and high temperature oil resistance even after heat fusion.

Hereinafter, each component thereof will be described in detail.

The electrical steel sheet 10 may be a general non-oriented or oriented electrical steel sheet without limitation. In the embodiment of the present invention, since the fused layer 30 are formed between the electrical steel sheets 10 to manufacture the electrical steel sheet laminate 100, a detailed description of the electrical steel sheets 10 will be omitted.

The fusion layer 30 is formed between the electrical steel sheets 10, and has adherence that is strong enough to adhere the electrical steel sheets 10 to each other without using the conventional fastening method such as welding, clamping, and interlocking.

The fusion layer 30 is formed by coating an adhesive coating composition on a surface thereof and curing to form an adhesive coating layer, which is then laminated and thermally fused to form the fusion layer 30. When the electrical steel sheets 10 on which the adhesive coating layer is formed are laminated and thermally fused, a resin component in the adhesive coating layer is thermally fused to form a fusion layer. Such a fusion layer contains a small amount of inorganic metal compounds in addition to a main component as an organic material. In the fusion layer, the inorganic components are uniformly dispersed in the organic material to form a microphase.

In an embodiment of the present invention, the fusion layer includes an olefin-based semi-crystalline polymer and at least one inorganic metal compound of a metal phosphate and a metal chromate.

The olefin-based semi-crystalline polymer forms a thermal compressed layer when thermally compressed, and is interposed between electrical steel sheets to impart adhesion between electrical steel sheets. When the thermal compression layer does not properly impart adherence between the electrical steel sheets, a plurality of precisely laminated electrical steel sheets are misaligned during a process. When laminated positions are misaligned, quality of a final manufactured electrical steel sheet product is adversely affected. The positions of the laminated electrical steel sheets may be prevented from being misaligned by securing the adhesive force after such thermal compression by a resin.

The olefin-based semi-crystalline polymer imparts adhesion between electrical steel sheets. In this case, when the olefin-based semi-crystalline polymer is used among organic resins, surface hardness of the adhesive layer is high due to crystals at a temperature below a melting point thereof, and thus damage caused by friction between the adhesive layer and a processing line is minimized, and flowability of the adhesive layer increases rapidly, at a temperature below the melting point, resulting in better adhesion. In the embodiment of the present invention, a semi-crystalline polymer indicates a polymer having both crystallinity and amorphousness. Specifically, it refers to a polymer having crystallinity of 50 to 90.

The olefin-based semi-crystalline polymer may specifically include one or more of a polyethylene semi-crystalline polymer and a polypropylene semi-crystalline polymer. In this case, it is possible to improve heat resistance of the fusion layer by selecting the olefin-based semi-crystalline polymer exemplified above. In other words, the olefin-based semi-crystalline polymer contributes to improving insulation, heat resistance, a surface characteristic, and the like of the fusion layer.

The olefin-based semi-crystalline polymer may have a weight average molecular weight of 1000 to 30,000 and a number average molecular weight of 1000 to 40,000. When each of the weight average molecular weight and the number average molecular weight is lower than a lower limit, physical properties of the adhesive coating layer such as hardenability and strength may be lowered, and when each of the weight average molecular weight and the number average molecular weight is higher than an upper limit, phase separation in the resin may occur, and compatibility with an inorganic metal compound may be deteriorated. More specifically, the olefin-based semi-crystalline polymer may have a weight average molecular weight of 5000 to 30,000.

In addition, a softening point Tg of the olefin-based semi-crystalline polymer may be 50 to 120° C. When the softening point Tg of the resin is too high, coating workability may be deteriorated.

The olefin-based semi-crystalline polymer is included at 85 to 95 wt % based on 100 wt % of the fusion layer 30. When too little of the olefin-based semi-crystalline polymer is included, there may be a problem that adherence of the fusion layer cannot be properly secured. When too much olefin-based semi-crystalline polymer is included, high temperature stability of the fusion layer 30 may be inferior. More specifically, the olefin-based semi-crystalline polymer may be included at 90 to 95 wt % based on 100 wt % of the fusion layer.

The fusion layer according to an embodiment of the present invention includes at least one inorganic metal compound of a metal phosphate and a metal chromate.

The metal phosphate used in an embodiment of the present invention is a complex metal phosphate represented by a chemical formula of $M_x(H_3PO_4)_y$, or a metal phosphate represented by a chemical formula of $M_x(PO_4)_y$.

The metal chromate used in an embodiment of the present invention is a complex metal chromate represented by a chemical formula of $M_x(H_2CrO_4)_y$, or a metal chromate represented by a chemical formula of $M_x(CrO_4)_y$.

The metal phosphate and metal chromate may include one or more metals of Al, Mg, Ca, Co, Zn, Zr, and Fe. Specific examples of the metal phosphate include aluminum monophosphate ($Al(H_3PO_4)_3$), cobalt monophosphate ($Co(H_3PO_4)_2$), calcium monophosphate ($Ca(H_3PO_4)_2$), zinc monophosphate ($Zn(H_3PO_4)_2$), and monobasic magnesium phosphate ($Mg(H_3PO_4)_2$).

The inorganic metal compound contributes to high temperature adhesion and high temperature oil resistance of a thermal fusion layer by thermal fusion.

The inorganic metal compound may be included at 5 to 15 wt % based on 100 wt % of the fusion layer. When too little of the inorganic metal compound is included, it may be difficult to properly secure the adhesion of the fusion layer. When too much of the inorganic metal compound is included, the adhesion of the fusion layer may be rather inferior due to aggregation of the inorganic metal compound. More specifically, the inorganic metal compound may be included at 5 to 10 wt % based on 100 wt % of the fusion layer.

The fusion layer 30 may include a microphase of an inorganic metal compound. The microphase of the inorganic metal compound is formed by agglomeration of the inorganic metal compound during thermal fusion to form a phase having a particle diameter of 0.01 μm or more.

With respect to a cross-section including a thickness direction of the fusion layer, a fraction of an area occupied by the microphase of the inorganic metal compound may be 10% or less. When the fraction of the area occupied by the microphase of the inorganic metal compound is too large, a fastening force of the fusion layer 30 may decrease. More specifically, with respect to the cross-sectional area of the fusion layer 30, the fraction of the area occupied by the microphase of the inorganic metal compound may be 5% or less.

An average diameter of the microphase of the inorganic metal compound may be 20% or less of a thickness of the fusion layer 30. When the average diameter of the microphase of the inorganic metal compound is too large, the adhesion may be lowered due to a decrease in stability of the fusion layer. More specifically, the average diameter of the microphase of the inorganic metal compound may be 10% or less of the thickness of the fusion layer 30. The cross-sectional area of the fusion layer 30 indicates a cross-sectional area including a thickness of a steel sheet, more specifically, a surface (TD surface) that is parallel to a cross-section in a vertical direction of rolling.

A thickness of the fusion layer 30 may be 0.5 to 40 μm. When the range is satisfied, the fusion layer 30 may have excellent surface characteristics (e.g., insulation, corrosion resistance, and close contacting property).

Figure 3:
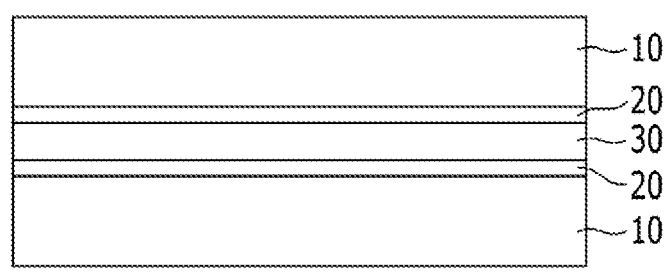
FIG. 3 illustrates a schematic diagram of a cross-section of an electrical steel sheet laminate according to another embodiment of the present invention.

FIG. 3 illustrates a schematic diagram of a cross-section of an electrical steel sheet laminate according to another embodiment of the present invention. As illustrated in FIG. 3, according to the embodiment of the present invention, the electrical steel sheet laminate 100 includes: a plurality of electrical steel sheets 10; fusion layers 30 disposed between the electrical steel sheets; and fusion interface layers 20 disposed between the electrical steel sheets 10.

For the fusion interface layers 20, inorganic metal compound components in the fusion layer 30 and metal components on surfaces of the electrical steel sheets 10 react with each other to form the fusion interface layers 20 during a coating or thermal fusion process. Magnetism of the electrical steel sheet laminate 100 may be further improved through appropriate formation of the fusion interface layers 20.

The fusion interface layers 20 may include at least one metal of Al, Mg, Ca, Co, Zn, Zr, and Fe (0.5 to 10 wt %), and at least one of P and Cr (5 to 30 wt %) and the balance of O.

P and Cr are derived from the inorganic metal compound in the fusion layer 30. At least one metal among Al, Mg, Ca, Co, Zn, Zr, and Fe is derived from the metal of the inorganic metal compound in the fusion layer 20.

A thickness of the fusion interface layer 20 may be 10 to 500 nm. When the fusion interface layer 20 is too thin, an oxide may be generated in the electrical steel sheets 10, which may adversely affect magnetism. When the fusion interface layer 20 is very thick, the close contacting property between the fusion interlayer layer 20 and the fusion layer 30 is not good, so a bonding strength may be deteriorated.

According to an embodiment of the present invention, a manufacturing method of an electrical steel sheet laminate includes: preparing an adhesive coating composition; forming an adhesive coating layer by coating the adhesive coating composition on a surface of an electric steel sheet and then curing it; and forming a fusion layer by laminating and thermally fusing a plurality of electrical steel sheets with an adhesive coating layer formed thereon.

Hereinafter, each step will be described in detail.

First, an adhesive coating composition is prepared.

Next, an adhesive coating layer is formed by coating layer an adhesive coating composition on a surface of an electric steel sheet and then curing it. This step can be performed in a temperature range of 100 to 300° C. for curing the adhesive coating composition.

A plurality of electrical steel sheets on which an adhesive coating layer is formed are stacked and thermally fused to form the fusion layer 30. Through the thermal fusion, polymer components in the adhesive coating layer are thermally fused to form a fusion layer.

The thermal fusing may be performed under conditions of a temperature of 100 to 300° C. a pressure of 0.05 to 5.0 MPa, and a time period of 0.1 to 120 min. The above conditions may be independently satisfied, and two or more conditions may be satisfied at the same time. They may be thermally fused between the electrical steel sheets without gaps or pores by adjusting the temperature, pressure, and time conditions in the thermal fusing.

The electrical steel sheet on which the adhesive coating layer was coated were stacked to be 20 mm high, and they were pressed with a force of 0.1 MPa to perform thermal coalescence to the same for 60 min at 120° C. The components of the thermal fusion layer and the adhesion of the thermally fused electrical steel sheet were measured by a shear surface tensioning method and summarized in Table 1.

The specific evaluation conditions are as follows.

Adhesion: was measured by using a device that measures a tensile force of a laminated sample while pulling it at a constant speed after fixing a specimen manufactured by a shear strength and T-Peeloff method to upper and lower jigs with a certain force. In this case, in the shear strength method, a measured value was a measured point where an interface with minimum adherence was missed from among interfaces of the stacked samples. The T-peeloff method was a constant force measured at the time of peeling, and was measured as an average value of points excluding first and last 10%.

TABLE 1

| | Fusion layer component (wt %) | | | | | |
|---|---|---|---|---|---|---|
| Division | Polyethylene semi-crystalline polymer (crystallinity of about 70) | Epoxy polymer | Aluminum phosphate | Magnesium chromate | Shear Adhesion (MPa) | Peeling Adhesion (N/mm) |
| Example 1 | 95 | 0 | 0 | 5 | 3 | 3 |
| Example 2 | 90 | 0 | 10 | 0 | 2.5 | 2 |
| Comparative Example 1 | 100 | 0 | 0 | 0 | 1.5 | 0.8 |
| Comparative Example 2 | 0 | 90 | 10 | 0 | 2 | 0.5 |
| Comparative Example 3 | 70 | 0 | 30 | 0 | 0.7 | 0.5 |

The thermal coalescence includes a heating step and a coalescing step, and a heating rate of the heating step may be from 10° C./min to 1000° C./min.

In the forming of the fusion layer 30, a fusion interface layer may be further formed between the fusion layer and the electrical steel sheet. Since the fusion layer 30 and the fusion interface layer 20 have been described above, overlapping descriptions will be omitted.

Hereinafter, examples of the present invention, comparative examples thereof, and evaluation examples thereof will be described. However, the following examples are only embodiments of the present invention, and the present invention is not limited thereto.

Experimental Example 1

A non-directional electrical steel sheet (50×50 mm, 0.35 mmt) was prepared as a blank specimen. An adhesive coating solution was coated on an upper portion and a lower portion of the prepared blank specimen with a constant thickness (about 5.0 μm) by using a bar coater and a roll coater, was hardened for 20 s at 200 to 250° C., and was then slowly cooled in the air to form an adhesive coating layer.

The specific evaluation conditions are as follows.

As shown in Table 1, as in Examples 1 to 2, when the components and contents of the fusion layer were properly adjusted, excellent shear adhesion and peeling adhesion were shown.

It can be confirmed that Comparative Example 1 does not contain inorganic metal compounds, so shear adhesion and peeling adhesion are inferior.

It can be seen that Comparative Example 2 includes an epoxy polymer other than a polyolefin-based semi-crystalline polymer, so the peeling adhesion is very inferior.

It can be seen that Comparative Example 3 contains a large amount of the inorganic metal compound, so both shear adhesion and peeling adhesion are inferior.

Experimental Example 2

It was carried out in the same manner as in Experimental Example 1 described above, but the structure of the fusion layer was changed as shown in Table 2.

TABLE 2

| Division | Fusion layer structure | | | Shear Adhesion (MPa) | Peeling Adhesion (N/mm) |
| --- | --- | --- | --- | --- | --- |
| | Fraction of microphase area of inorganic metal compound | Average particle diameter of microphase image of inorganic metal compound | Fusion layer thickness | | |
| Example 3 | 5% | 0.2 μm | 6 μm | 1.7 | 2 |
| Example 4 | 10% | 0.6 μm | 20 μm | 1.8 | 1.5 |
| Comparative Example 4 | 20% | 1 μm | 3 μm | 0.5 | 0.6 |
| Comparative Example 5 | 5% | 0.05 μm | 0.3 μm | 0.3 | 0.2 |

As shown in Table 2, as in Example 3 and Example 4, when the fusion layer structure was properly formed, excellent shear adhesion and peeling adhesion were shown.

In Comparative Example 4, it can be seen that the microphase area fraction and particle diameter of the inorganic metal compound are high, so both shear adhesion and peeling adhesion are inferior.

In Comparative Example 5, it was confirmed that since the thickness of the fusion layer was too thin, both shear adhesion and peeling adhesion were inferior.

Experimental Example 3 It was carried out in the same manner as in Experimental Example 1, but was carried out while changing the components of the fusion interface layer as shown in Table 3.

TABLE 3

| Division | Fusion layer component (wt %) | | | Re-mark | Shear Adhesion (MPa) | Peeling Adhesion (N/mm) |
| --- | --- | --- | --- | --- | --- | --- |
| | P, Cr | Al, Mg, Ca, Co, Zn, Zr, Fe | O | | | |
| Example 5 | 20 | 3 | 67 | — | 2.4 | 3 |
| Example 6 | 10 | 1 | 49 | — | 1.5 | 2.5 |
| Comparative Example 6 | 40 | 0 | 60 | — | 1.6 | 0.5 |
| Comparative Example 7 | 0 | 5 | 75 | Si: 20 | 0.7 | 0.3 |

As shown in Table 3, as in Example 5 and Example 6, when the fusion interface layer structure was properly formed, excellent shear adhesion and peeling adhesion were shown.

Comparative Example 6 used a phosphate as an inorganic metal compound instead of a metal phosphate, so does not contain metals such as Al, Mg, Ca, Co, Zn, Zr, Fe, etc., and the fusion interface layer was not formed firmly, and thus the shear adhesion was excellent but the peeling adhesion was inferior.

Comparative Example 7 used a silane-based and titanium-based inorganic material as an inorganic metal compound instead of a metal phosphate or metal chromate, so it does not contain P and Cr, and the fusion interface layer was not formed firmly, and thus the shear adhesion and the peeling adhesion were inferior.

The present invention may be embodied in many different forms, and should not be construed as being limited to the disclosed embodiments. In addition, it will be understood by those skilled in the art that various changes in form and details may be made thereto without departing from the technical spirit and essential features of the present invention. Therefore, it is to be understood that the above-described embodiments are for illustrative purposes only, and the scope of the present invention is not limited thereto.

<Description of Symbols>

| 100: electrical steel sheet laminate | 10: electrical steel sheet |
| --- | --- |
| 20: fusion interface layer | 30: fusion layer |

The invention claimed is:

1. An electrical steel sheet laminate comprising:
a plurality of electrical steel sheets; and
a fusion layer disposed between the electrical steel sheets,
wherein the fusion layer includes: an olefin-based semi-crystalline polymer at 85 to 95 wt %, and
at least one inorganic metal compound at 5 to 15 wt % among a metal phosphate and a metal chromate,
wherein the an olefin-based semi-crystalline polymer has crystallinity of 50 to 90, and
wherein the electrical steel sheet laminate has a microphase of the inorganic metal compound in the fusion layer, and with respect to a cross-section including a thickness direction of the fusion layer, a fraction of an area occupied by the microphase of the at least one inorganic metal compound is 10% or less.

2. The electrical steel sheet laminate of claim 1, wherein the olefin-based semi-crystalline polymer includes at least one of a polyethylene semi-crystalline polymer and a polypropylene semi-crystalline polymer.

3. The electrical steel sheet laminate of claim 1, wherein the olefin-based semi-crystalline polymer has a weight average molecular weight of 1000 to 30,000.

4. The electrical steel sheet laminate of claim 1, wherein the olefin-based semi-crystalline polymer has a softening point of 50 to 120° C.

5. The electrical steel sheet laminate of claim 1, wherein the metal phosphate and the metal chromate have at least one metal of Al, Mg, Ca, Co, Zn, Zr, and Fe.

6. The electrical steel sheet laminate of claim 1, wherein an average particle diameter of the microphase of the inorganic metal compound is 20% or less of a thickness of the fusion layer.

7. The electrical steel sheet laminate of claim 1, wherein the thickness of the fusion layer is 0.5 to 40 μm.

8. The electrical steel sheet laminate of claim 1, further comprising
a fusion interface layer disposed between the electrical steel sheets and the fusion layer.

9. The electrical steel sheet laminate of claim 8, wherein the fusion interface layers 20 include at least one metal of Al, Mg, Ca, Co, Zn, Zr, and Fe in a total amount of 0.5 to 10 wt %, and at least one of P and Cr in a total amount of 5 to 30 wt % and a balance of O.

10. The electrical steel sheet laminate of claim 8, wherein the thickness of the fusion layer is 10 to 500 nm.

\* \* \* \* \*